United States Patent
Wright et al.

(10) Patent No.: US 9,377,553 B2
(45) Date of Patent: Jun. 28, 2016

(54) RIGID COAXIAL TRANSMISSION LINE SECTIONS JOINED BY CONNECTORS FOR USE IN A SUBTERRANEAN WELLBORE

(71) Applicant: HARRIS CORPORATION, Melbourne, FL (US)

(72) Inventors: Brian Wright, Indialantic, FL (US); Murray Hann, Malabar, FL (US); Raymond Hewit, Palm Bay, FL (US); Ryan Whitney, Indialantic, FL (US)

(73) Assignee: HARRIS CORPORATION, Melbourne, FL (US)

( * ) Notice: Subject to any disclaimer, the term of this patent is extended or adjusted under 35 U.S.C. 154(b) by 0 days.

(21) Appl. No.: 14/024,875

(22) Filed: Sep. 12, 2013

(65) Prior Publication Data
US 2015/0070112 A1   Mar. 12, 2015

(51) Int. Cl.
*G01V 3/18*   (2006.01)
*H01P 3/06*   (2006.01)
*H01P 1/04*   (2006.01)
*E21B 36/04*  (2006.01)
(Continued)

(52) U.S. Cl.
CPC ........... *G01V 3/18* (2013.01); *E21B 17/003* (2013.01); *E21B 17/028* (2013.01); *E21B 36/04* (2013.01); *E21B 43/2401* (2013.01); *H01P 1/045* (2013.01); *H01P 3/06* (2013.01); *H01R 13/523* (2013.01); *Y10T 29/49123* (2015.01)

(58) Field of Classification Search
CPC .......... G01V 3/18; G01V 11/005; H01P 3/06; H01P 1/045

USPC ................ 333/243, 244, 245, 260; 340/854.1
See application file for complete search history.

(56) References Cited

U.S. PATENT DOCUMENTS

| 2,187,584 A | 1/1940 | Gothe |
| 2,351,520 A | 6/1944 | Katzin |

(Continued)

FOREIGN PATENT DOCUMENTS

| WO | 2013192124 | 12/2013 |
| WO | 2014160137 | 10/2014 |

OTHER PUBLICATIONS

"Drill Faster, Farther, Deeper," Aluminum Drill Pipe, Inc. brochure (Addendum Feb. 28, 2008).

(Continued)

*Primary Examiner* — Benny Lee
(74) *Attorney, Agent, or Firm* — Allen, Dyer, Doppelt, Milbrath & Gilchrist, P.A. Attorneys at Law

(57) ABSTRACT

A rigid RF coaxial transmission line is positioned within a wellbore in a subterranean formation. The rigid RF coaxial transmission line includes a series of rigid coaxial sections coupled together in end-to-end relation and to be positioned within the wellbore of the subterranean formation. Each rigid coaxial section includes an inner conductor, a rigid outer conductor surrounding the inner conductor, and a dielectric therebetween. Each of the rigid outer conductors has threaded ends. The rigid RF coaxial transmission line includes a respective connector between adjacent ones of the series of rigid coaxial sections, each connector having a rigid outer layer threadingly secured to respective threaded ends of adjacent rigid outer conductors, and an electrically conductive liner carried by the rigid outer layer and defining an electrical joint between the adjacent rigid outer conductors.

27 Claims, 7 Drawing Sheets

(51) Int. Cl.
 *E21B 43/24* (2006.01)
 *E21B 17/00* (2006.01)
 *E21B 17/02* (2006.01)
 *H01R 13/523* (2006.01)

(56) References Cited

U.S. PATENT DOCUMENTS

| | | | |
|---|---|---|---|
| 2,795,397 A | 6/1957 | Hull et al. | |
| 3,496,496 A | 2/1970 | Fiebel | |
| 3,716,652 A | 2/1973 | Lusk et al. | |
| 3,813,479 A * | 5/1974 | Olivero | 174/88 C |
| 4,012,092 A | 3/1977 | Godbey | |
| 4,207,574 A | 6/1980 | Toia | |
| 4,359,743 A | 11/1982 | DeSantis | |
| 4,498,086 A | 2/1985 | Sandler | |
| 4,543,548 A | 9/1985 | Seal | |
| 4,583,589 A | 4/1986 | Kasevich | |
| 4,647,941 A | 3/1987 | Myer | |
| 4,660,910 A | 4/1987 | Sharp | |
| 5,065,819 A | 11/1991 | Kasevich | |
| 5,068,672 A | 11/1991 | Onnigian et al. | |
| 5,109,927 A | 5/1992 | Supernaw et al. | |
| 5,455,548 A | 10/1995 | Grandchamp et al. | |
| 5,568,161 A | 10/1996 | Fulmer, Sr. | |
| 5,617,105 A | 4/1997 | Tsunekawa et al. | |
| 5,751,895 A | 5/1998 | Bridges | |
| 6,154,179 A | 11/2000 | Kohno | |
| 6,189,611 B1 | 2/2001 | Kasevich | |
| 6,415,869 B1 | 7/2002 | Smith | |
| 6,681,861 B2 | 1/2004 | Davidson et al. | |
| 6,712,644 B1 | 3/2004 | DeCormier | |
| 6,720,934 B1 | 4/2004 | Price et al. | |
| 6,771,227 B2 | 8/2004 | Tsai et al. | |
| 7,055,599 B2 | 6/2006 | Kasevich | |
| 7,239,286 B1 | 7/2007 | Miller et al. | |
| 7,404,725 B2 | 7/2008 | Hall | |
| 7,441,597 B2 | 10/2008 | Kasevich | |
| 7,488,194 B2 * | 2/2009 | Hall et al. | 439/191 |
| 7,891,421 B2 | 2/2011 | Kasevich | |
| 7,962,288 B2 | 6/2011 | Gleitman | |
| 8,003,014 B2 | 8/2011 | Breay et al. | |
| 8,128,786 B2 | 3/2012 | White et al. | |
| 8,556,656 B2 | 10/2013 | Thomas | |
| 8,847,711 B2 | 9/2014 | Wright et al. | |
| 8,969,722 B2 | 3/2015 | Bonn | |
| 9,016,367 B2 | 4/2015 | Wright | |
| 9,157,305 B2 | 10/2015 | Dittmer | |
| 2002/0093431 A1 * | 7/2002 | Zierolf | 340/854.1 |
| 2002/0189817 A1 | 12/2002 | Davidson et al. | |
| 2003/0032339 A1 | 2/2003 | Bell et al. | |
| 2005/0199386 A1 | 9/2005 | Kinzer | |
| 2005/0200498 A1 | 9/2005 | Gleitman | |
| 2007/0187089 A1 | 8/2007 | Bridges | |
| 2008/0166917 A1 | 7/2008 | Hall et al. | |
| 2009/0272576 A1 | 11/2009 | Medina | |
| 2010/0078163 A1 | 4/2010 | Banerjee et al. | |
| 2010/0294488 A1 | 11/2010 | Wheeler et al. | |
| 2010/0294489 A1 | 11/2010 | Dreher, Jr. et al. | |
| 2012/0012219 A1 | 1/2012 | Breay et al. | |
| 2012/0176138 A1 | 7/2012 | Prammer | |
| 2013/0048278 A1 | 2/2013 | Parsche et al. | |
| 2013/0180729 A1 | 7/2013 | Wright et al. | |
| 2013/0334205 A1 | 12/2013 | Wright | |
| 2014/0041890 A1 | 2/2014 | Wright | |
| 2014/0224472 A1 | 8/2014 | Parsche | |
| 2014/0262222 A1 | 9/2014 | Wright et al. | |
| 2014/0262223 A1 | 9/2014 | Wright et al. | |
| 2014/0262224 A1 | 9/2014 | Ayers et al. | |

OTHER PUBLICATIONS

Wright et al., U.S. Appl. No. 14/034,889, filed Sep. 24, 2013.

* cited by examiner

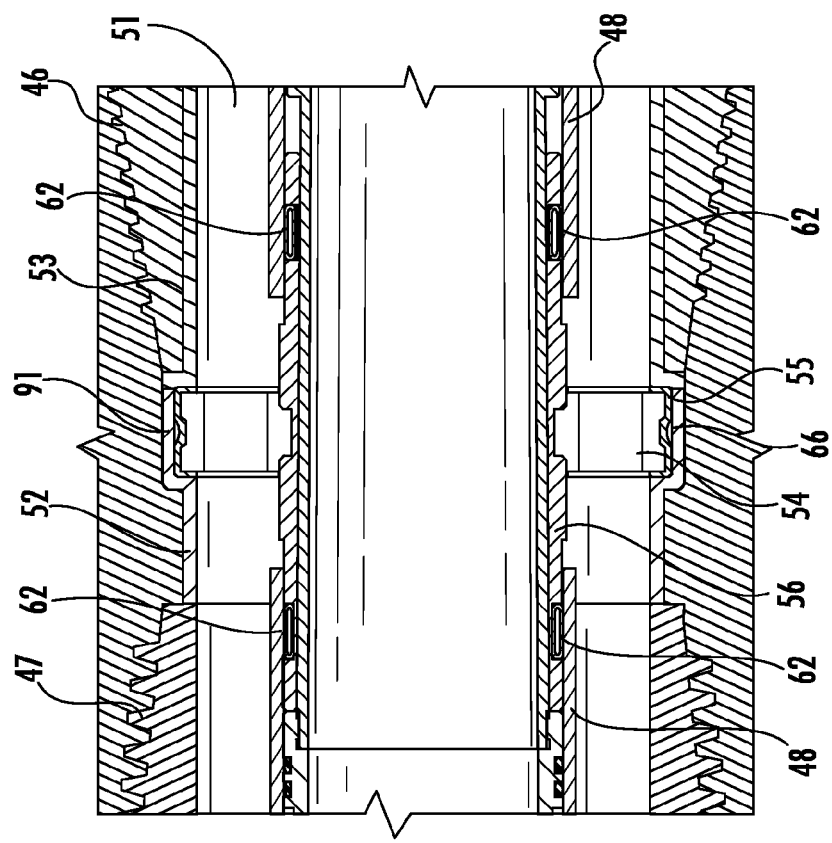
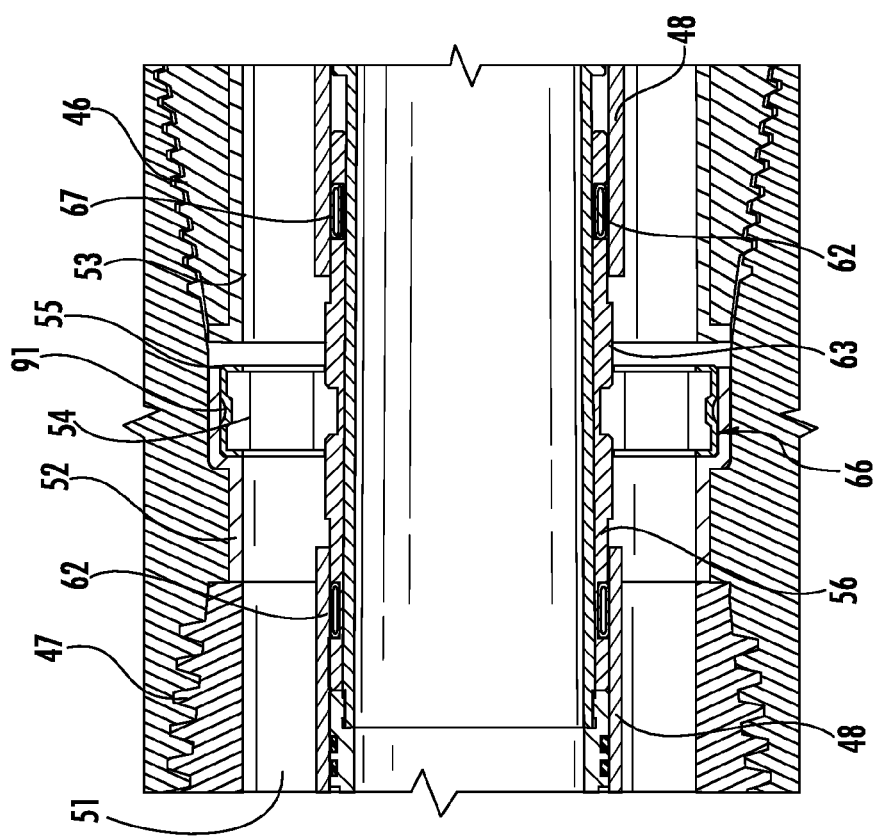

RIGID COAXIAL TRANSMISSION LINE SECTIONS JOINED BY CONNECTORS FOR USE IN A SUBTERRANEAN WELLBORE

FIELD OF THE INVENTION

The present invention relates to the field of radio frequency (RF) equipment, and, more particularly, to an RF coaxial transmission line, such as, for hydrocarbon resource recovery using RF heating and related methods.

BACKGROUND OF THE INVENTION

To recover a hydrocarbon resource from a subterranean formation, wellbore casings or pipes are typically coupled together in end-to-end relation within the subterranean formation. Each wellbore casing may be rigid, for example, and be relatively strong. Each wellbore casing may include steel.

To more efficiently recover a hydrocarbon resource from the subterranean formation, it may be desirable to apply RF power to the subterranean formation within (or adjacent to) the hydrocarbon resource. To accomplish this, a rigid coaxial feed arrangement or transmission line may be desired to couple to a transducer in the subterranean formation. Typical commercial designs of a rigid coaxial feed arrangement are not generally designed for structural loading or subterranean use, as installation generally requires long runs of the transmission line along the lines of 500-1500 meters, for example. As an example, a typical overhead transmission line may be capable of 1,000 lbs tension, while it may be desirable for a downhole transmission line to have 150,000 to 500,000 lbs tensile capability, which may amount to 150 to 500 times the capacity of an existing commercial product.

One approach to a rigid coaxial feed arrangement uses two custom aluminum assemblies, one structural tube and one coaxial assembly therein. This approach may have a reduced cost, increased structural performance, increased ease of assembly, and increased compliance with oil field standards. Additionally, a high conductivity pipe (copper or aluminum) may be selected for a best galvanic match to a desired wellbore casing. A custom threaded aluminum coaxial transmission line may address this. However, aluminum is strength limited and generally will not handle structural load requirements without a secondary structural layer.

To address this, one approach uses a primary structural tube with a supported (floating) coaxial transmission line carried therein. The structural tube assumes the installation and operational loads.

U.S. Patent Application Publication No. 2007/0187089 to Bridges et al. discloses an RF technology heater for unconventional resources. More particularly, Bridges et al. discloses a heater assembly for heating shale oil. The heater assembly includes an inner conductor and an outer conductor or well casing electrically isolated from the inner conductor. Copper, or aluminum is coated on the interior of the outer conductor or casing to maintain temperature, increase conductivity, and maintain a robust structure.

Another approach is disclosed in U.S. Pat. No. 5,455,548 to Grandchamp et al. Grandchamp et al. discloses a structural RF coaxial that uses a bolt and flange method for assembly. A drawback to this approach is that assembly time may be significant.

It may thus be desirable to provide a relatively high strength coaxial transmission line for use in a subterranean formation. More particularly, it may be desirable to provide a high strength coaxial transmission using less components, and that can withstand relatively high stresses associated with hydrocarbon resource recovery in a subterranean formation.

SUMMARY OF THE INVENTION

In view of the foregoing background, it is therefore an object of the present invention to provide a rigid RF coaxial transmission line that is readily assembled and less costly.

This and other objects, features, and advantages in accordance with the present invention are provided by a rigid RF coaxial transmission line to be positioned within a wellbore in a subterranean formation. The rigid RF coaxial transmission line comprises a series of rigid coaxial sections coupled together in end-to-end relation and configured to be positioned within the wellbore of the subterranean formation, each rigid coaxial section comprising an inner conductor, a rigid outer conductor surrounding the inner conductor, and a dielectric therebetween. Each of the rigid outer conductors has threaded ends. The rigid RF coaxial transmission line includes a respective connector between adjacent ones of the series of rigid coaxial sections, each connector comprising a rigid outer layer threadingly secured to respective threaded ends of adjacent rigid outer conductors, and an electrically conductive liner carried by the rigid outer layer and defining an electrical joint between the adjacent rigid outer conductors. Advantageously, the rigid RF coaxial transmission line is mechanically strong and readily assembled.

More specifically, the electrical joint may comprise an electrically conductive compression joint. Each connector may comprise a longitudinally compressible spacer carried by the electrically conductive liner and having a bore therethrough, and an inner conductor coupler carried by the bore of the longitudinally compressible spacer and electrically coupling adjacent ends of the inner conductor. Additionally, the longitudinally compressible spacer may comprise a dielectric body and an electrically conductive sleeve surrounding the dielectric body. The rigid outer layer may have a recess at a medial portion thereof receiving the longitudinally compressible spacer.

In some embodiments, the rigid outer layer and the electrically conductive liner may be bonded together. For example, the electrically conductive liner may have a greater electrical conductivity than the rigid outer layer. The electrically conductive liner may have a same electrical conductivity as the rigid outer conductor. For example, the rigid outer layer may comprise steel. Also, the electrically conductive liner may comprise at least one of copper, aluminum, gold, or beryllium.

Another aspect is directed to a method for making a rigid RF coaxial transmission line to be positioned within a wellbore in a subterranean formation. The method comprises coupling a series of rigid coaxial sections together in end-to-end relation and to be positioned within the wellbore of the subterranean formation, each rigid coaxial section comprising an inner conductor, a rigid outer conductor surrounding the inner conductor, and a dielectric therebetween. Each of the rigid outer conductors has threaded ends. The method also comprises coupling a respective connector between adjacent ones of the series of rigid coaxial sections, each connector comprising a rigid outer layer threadingly secured to respective threaded ends of adjacent rigid outer conductors, and an electrically conductive liner carried by the rigid outer layer and defining an electrical joint between the adjacent rigid outer conductors.

Yet another aspect is directed to a method of assembling a rigid RF coaxial transmission line within a wellbore in a subterranean formation. The method comprises positioning a first rigid coaxial section in the wellbore, the first rigid coaxial section comprising an inner conductor, a rigid outer conductor surrounding the inner conductor, and a dielectric therebetween. The rigid outer conductor has a threaded end extending away from the wellbore. The method also includes coupling a connector to the first rigid coaxial section, the connector comprising a rigid outer layer threadingly secured to the threaded end of the first rigid coaxial section, and an electrically conductive liner carried by the rigid outer layer. The method comprises coupling a threaded end of a second rigid coaxial section to the connector so that the electrically conductive liner defines an electrical joint between adjacent rigid outer conductors of the first and second first rigid coaxial sections.

BRIEF DESCRIPTION OF THE DRAWINGS

FIGS. 5-6 are enlarged cross-sectional views of the connector from FIG. 4 during assembly.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
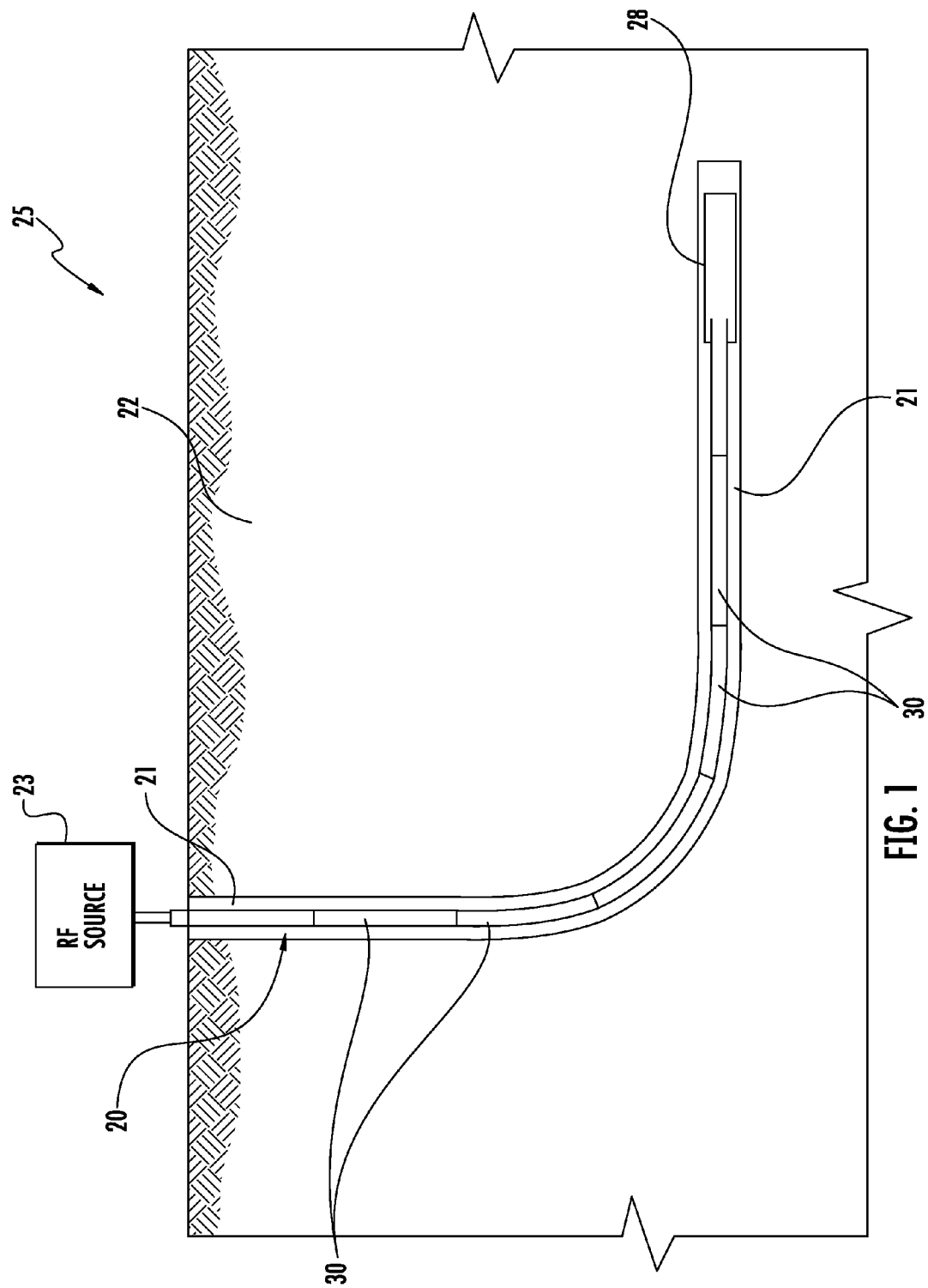
FIG. 1 is a schematic diagram of a hydrocarbon recovery system in a subterranean formation, according to the present invention.
Figure 2:
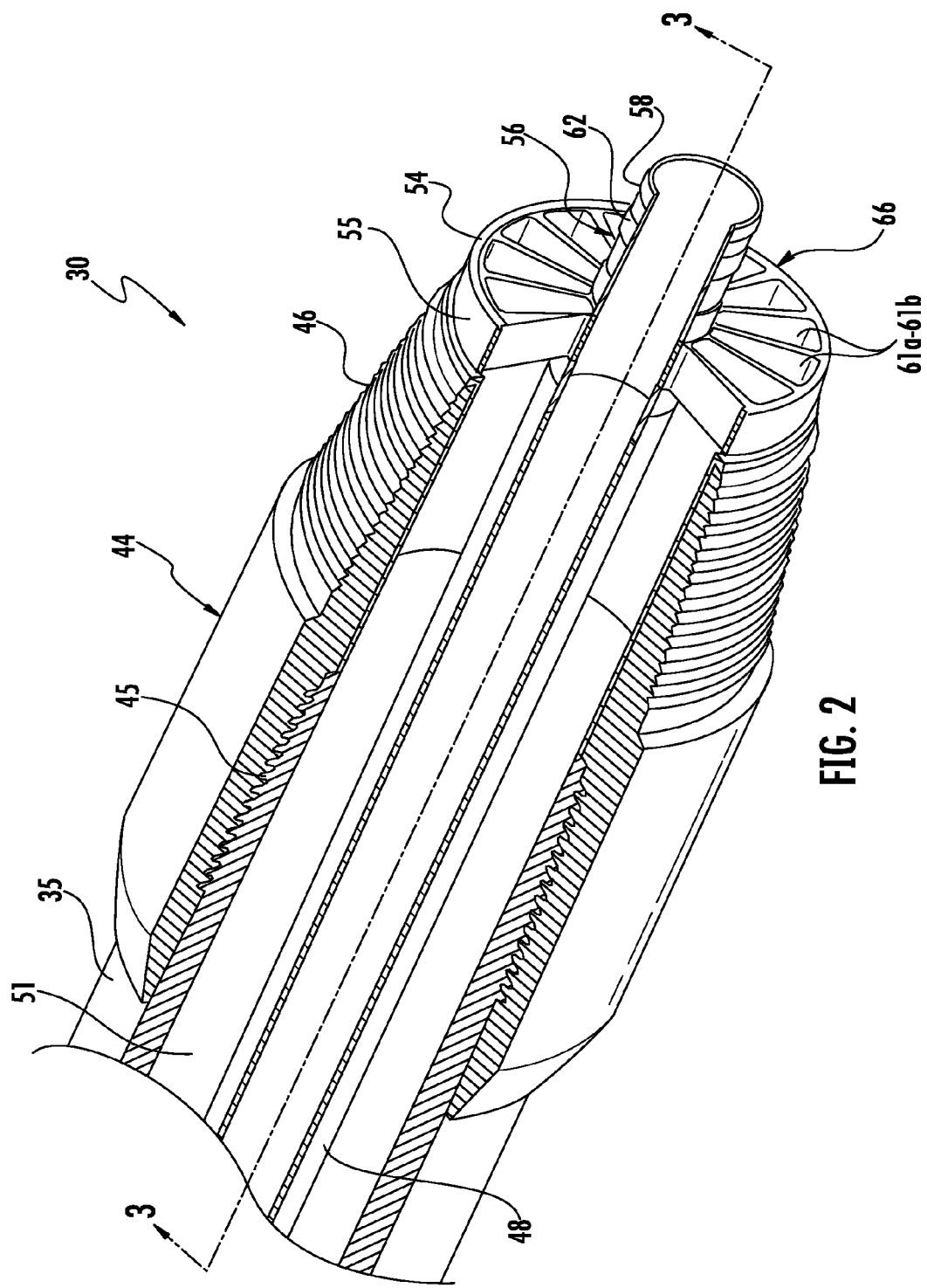
FIG. 2 is a fragmentary view of a rigid coaxial section with a portion of the connector threaded on a rigid coaxial section from FIG. 1.
Figure 3:
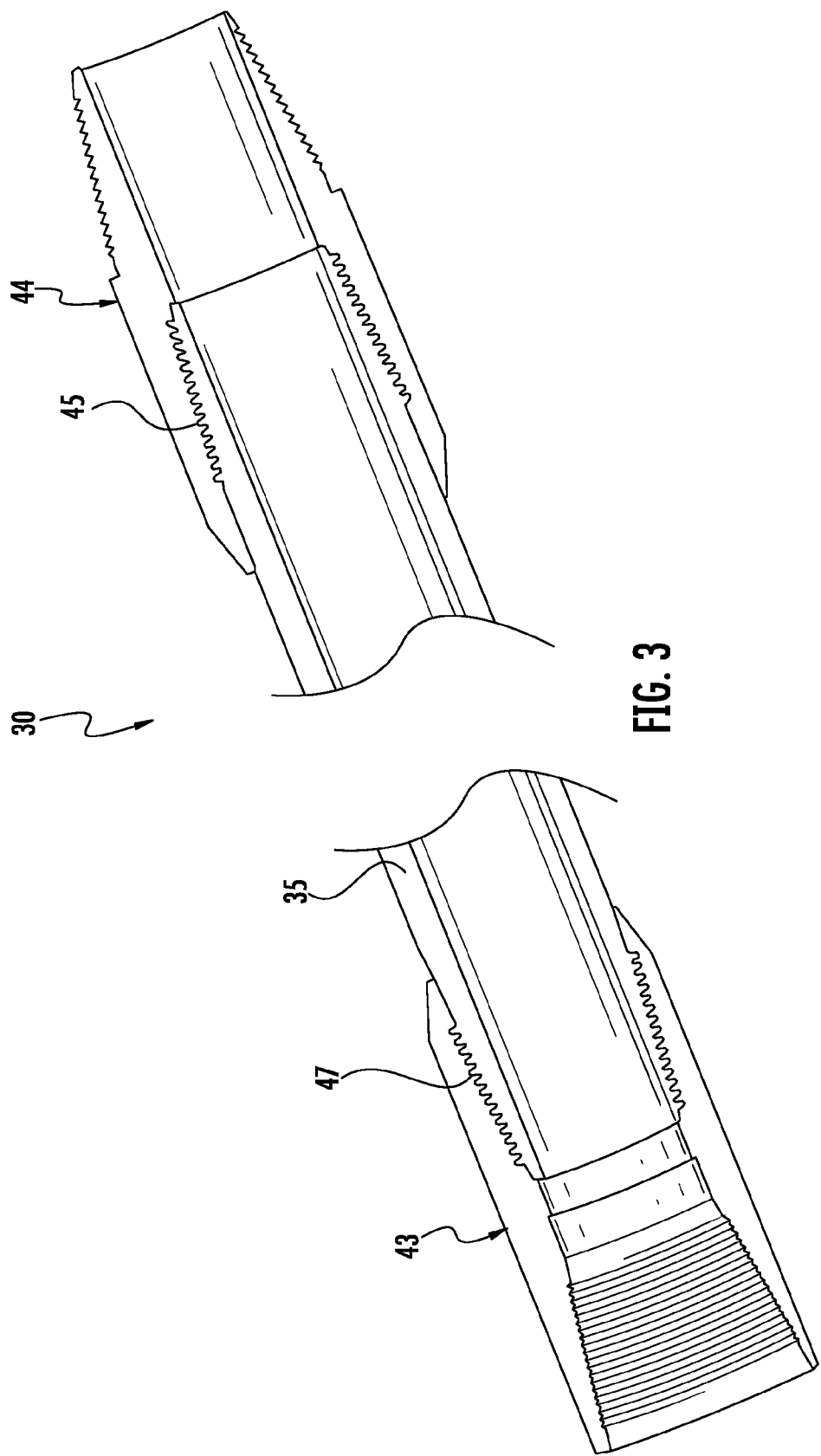
FIG. 3 is a cross-sectional view of the rigid coaxial section from FIG. 2 along line 3-3 with the spacer and inner conductor structure removed.

Referring initially to FIGS. 1-3, a hydrocarbon recovery system 25 (FIG. 1) is now described. The hydrocarbon recovery system 25 includes an RF source 23 (FIG. 1), and a rigid RF coaxial transmission line 20 (FIG. 1) coupled thereto. The rigid RF coaxial transmission line 20 is positioned within a wellbore 21 (FIG. 1) in a subterranean formation 22 (FIG. 1). The hydrocarbon recovery system 25 includes an RF antenna assembly 28 (FIG. 1) coupled to the rigid RF coaxial transmission line 20 and being configured to RF heat the hydrocarbon resources in the subterranean formation 22 adjacent an end of the wellbore 21. The rigid RF coaxial transmission line 20 comprises a series of rigid coaxial sections 30 (FIGS. 1-3) coupled together in end-to-end relation and configured to be positioned within the wellbore 21 of the subterranean formation 22.

Referring additionally to FIGS. 1-6, and 8, each rigid coaxial section 30 (FIGS. 2-3) illustratively includes an inner conductor 48 (FIGS. 2, 4), a rigid outer conductor 35 (FIGS. 2-4) surrounding the inner conductor, and a dielectric 51 (FIGS. 2, 4-6) (e.g. air, dielectric fluid, coolant, etc.) therebetween. Each of the rigid outer conductors 35 has threaded ends 45 (FIGS. 2-4), 47 (FIGS. 3-6).

Figure 4:
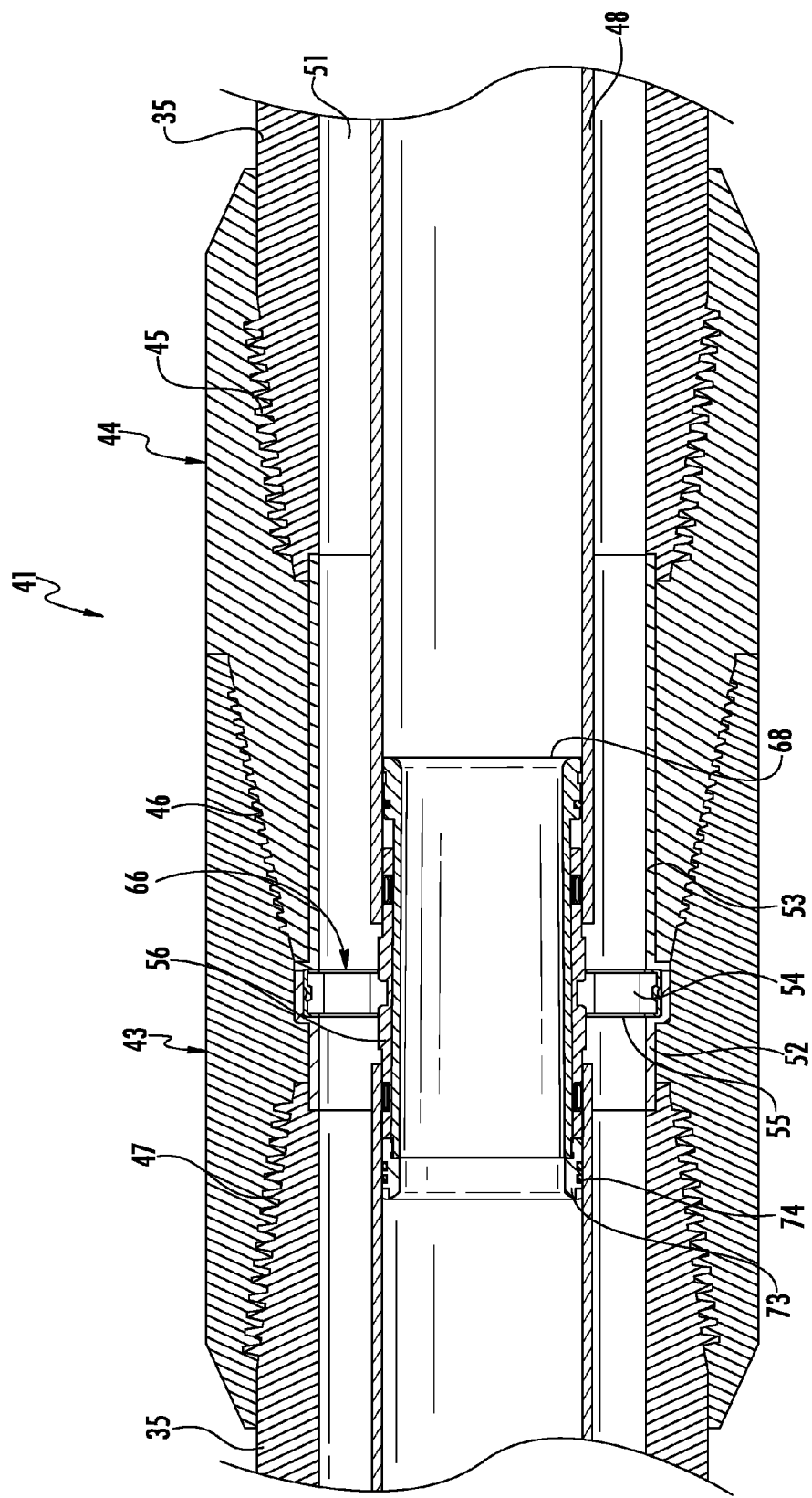
FIG. 4 is an enlarged cross-sectional view of adjacent rigid coaxial sections and a connector therebetween from FIG. 1.

The rigid RF coaxial transmission line 20 (FIG. 1) includes a respective connector 41 (FIG. 4) between adjacent ones of the series of rigid coaxial sections 30. Each connector 41 (FIG. 4) comprises a rigid outer layer 43-44 (FIGS. 3-4) threadingly secured to respective threaded ends 45, 47 (FIGS. 3-6) of adjacent rigid outer conductors 35, and an electrically conductive liner 52-53 (FIGS. 4-6, 8) carried by the rigid outer layer and defining an electrical joint between adjacent rigid outer conductors. In some embodiments, the rigid outer layer 43-44 (FIGS. 3-4) and the electrically conductive liner 52-53 may be bonded together. For example, the electrically conductive liner 52-53 may be hydroformed onto the rigid outer layer 43-44 (FIGS. 3-4). In other embodiments, the electrically conductive liner 52-53 may be welded, brazed, or press fitted onto the rigid outer layer 43-44 (FIGS. 3-4). In the brazed embodiments, the bonding process may include using a flux paste and induction or dip heating (i.e. hot bath).

As perhaps best seen in FIG. 4, the rigid outer layer of the connector 41 (FIG. 4) comprises a first portion 43 and a second portion 44. The first portion 43 and the second portion 44 are threadingly coupled together at a threaded surface 46 (FIGS. 2, 4-6). Also, the electrically conductive liner similarly comprises a first portion 52 and a second portion 53 (FIGS. 4-6, 8) respectively coupled to the first portion 43 and the second portion 44 of the rigid outer layer. The first portion 43 and the second portion 44 of the rigid outer layer are counter bored to receive the electrically conductive liner 52-53, and are illustratively tapered to provide more mechanical strength.

In some embodiments, the electrically conductive liner 52-53 may have a greater electrical conductivity than the rigid outer layer 43-44 (FIGS. 3-4), thereby providing lower power transfer losses. Also, the electrically conductive liner 52-53 may have a same electrical conductivity as the rigid outer conductor 35.

For example, the rigid outer layer 43-44 (FIGS. 3-4) may comprise steel. Also, the electrically conductive liner 52-53 may comprise at least one of copper, aluminum, gold, and beryllium. In one embodiment, the rigid outer conductors 35 and the electrically conductive liner 52-53 both comprise aluminum, thereby providing a constant conductivity path throughout the rigid RF coaxial transmission line 20 (FIG. 1). Advantageously, the electrically conductive liner 52-53 permits strong structural materials, such as steel, to be used while maintaining a high conductivity for the connector 41 (FIG. 4). More specifically, the rigid outer conductors 35 may each have the following characteristics: 5 inch outer diameters, minimum tensile strength 442,000 lbm, maximum internal pressure 9500 psi, and weight of 13.5 lb/ft. Each rigid coaxial section 30 may have a length of 30 feet, for example.

Moreover, the rigid outer conductors 35 may be readily available, i.e. commercial of the shelf (COTS). For example, the rigid outer conductors 35 may comprise aluminum drill pipes from Aluminum Drill Pipe, Inc. of Sugarland, Tex., modified with the teachings herein. Advantageously, the rigid RF coaxial transmission line 20 (FIG. 1) readily incorporates COTS components, being modified by the teachings herein, which makes assembly easier with the use of standard tooling. This may also reduce the cost of the rigid RF coaxial transmission line 20 and reduce assembly time.

Referring now additionally to FIGS. 1-8, the electrical joint comprises an electrically conductive compression joint. In particular, each connector 41 (FIG. 4) comprises a longitudinally compressible spacer 66 (FIGS. 2, 4-8) carried by the electrically conductive liner 52-53 and having a bore therethrough, and an inner conductor coupler 56 (FIGS. 2, 4-8) carried by the bore of the longitudinally compressible spacer and electrically coupling adjacent ends of the inner conductor 48 (FIGS. 2, 4-6). Additionally, the longitudinally compressible spacer 66 illustratively includes a dielectric body 54 (FIGS. 2, 4-8) and an electrically conductive sleeve 55 (FIGS. 2, 4-8) surrounding the dielectric body. In one embodiment, the electrically conductive sleeve 55 comprises beryllium and copper (BeCu). The electrically conductive sleeve 55 may also additionally or alternatively comprise brass. The rigid outer layer 43-44 (FIGS. 3-4) illustratively includes a recess 91 (FIGS. 5-6, 8) at a medial portion thereof receiving the longitudinally compressible spacer 66.

Figure 7:
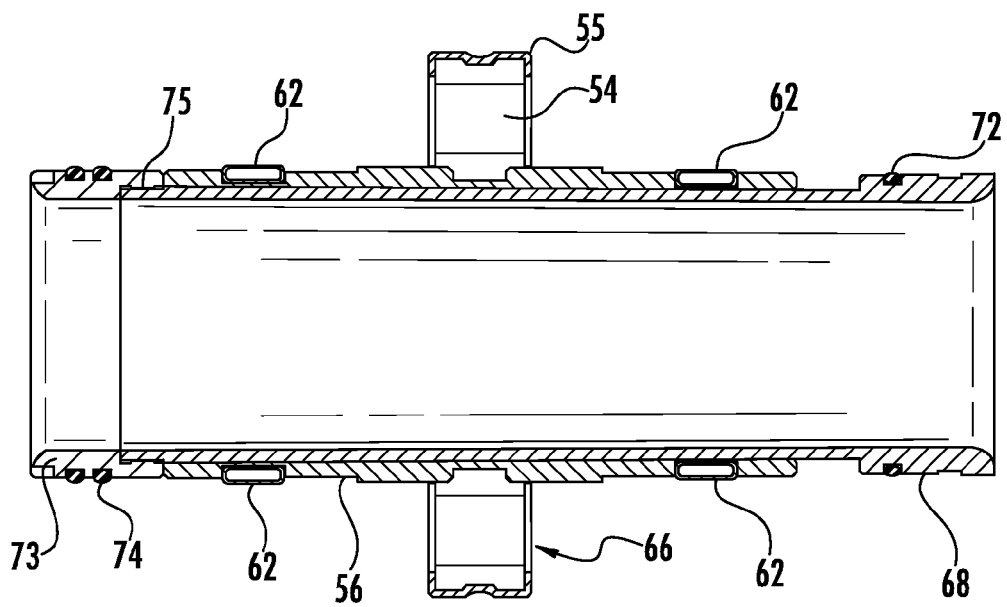
FIG. 7 is a cross-sectional view of the spacer and inner conductor coupler from FIG. 1.
Figure 8:
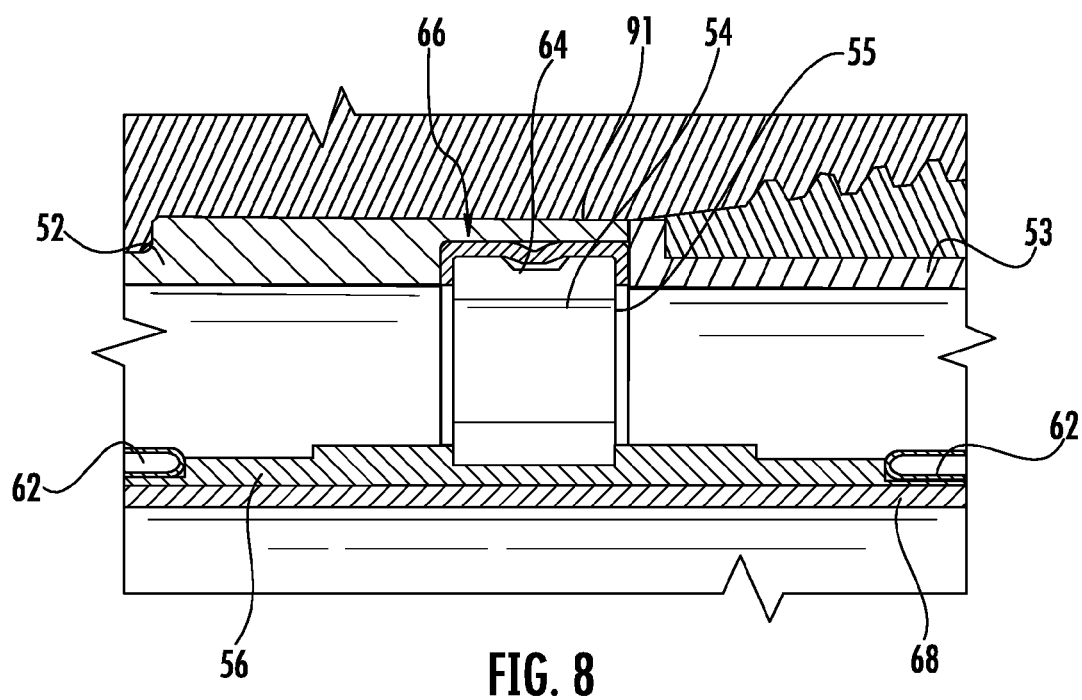
FIG. 8 is an enlarged cross-sectional view of the spacer and electrically conductive liner from FIG. 1.

Referring now additionally to FIGS. 4-8, the connector 41 (FIG. 4) comprises a plurality of circular electrical contact springs 62 (FIGS. 5-8) surrounding the inner conductor coupler 56 and aiding in the transfer of electrical current on the inner conductor 48 (FIGS. 2, 4-6) thereon, and an O-ring 72, 74 (FIGS. 7-8) on the inner conductor coupler for providing a seal against the inner conductor. The connector 41 (FIG. 4) illustratively includes a tubular bullet structure comprising first and second tubular portions 68, 73 (FIG. 7). As perhaps best seen in FIG. 7, the first and second tubular portions 68, 73 are threadingly coupled to each other at a threaded surface 75 (FIG. 7) therebetween. Additionally, the first and second tubular portions 68, 73 each comprises the O-rings 72, 74 for providing a tight seal with the inner conductor 48. The first and second tubular portions 68, 73 may comprise a dielectric material, steel, copper, brass, bronze.

Moreover, as perhaps best seen in FIG. 2, the longitudinally compressible spacer 66 illustratively includes a plurality of passageways 61a-61b (FIG. 2) for permitting the flow of fluid therethrough. Advantageously, the rigid RF coaxial transmission line 20 (FIG. 1) permits the flow of fluid in two sealed and separate passageways, i.e. within the inner conductor 48, and between the inner conductor and the rigid outer conductor 35.

As shown in FIGS. 5-6, as the second portion 44 (FIGS. 2-4) of the rigid outer layer of the connector 41 (FIG. 4) is threaded onto the first portion 43 (FIGS. 3-4), the second portion 53 of the electrically conductive liner is brought into contact with the first portion 52. In FIG. 5, before the second portion 44 of the rigid outer layer of the connector 41 (FIG. 4) is completely threaded onto the first portion 43, there is a gap 63 between the first and second portion 52-53 of the electrically conductive liner, which is closed in FIG. 6.

In particular, the compressive force causes the longitudinally compressible spacer 66 to deform and to form a solid electrical connection via the deformed electrically conductive sleeve 55, as shown in FIG. 6. As perhaps best seen in FIG. 8, the dielectric body 54 illustratively includes a circumferential recess 64 (FIG. 8), and the electrically conductive sleeve 55 deforms to partially fill the recess in the dielectric body.

Indeed, the spring constant of the longitudinally compressible spacer 66 is tied with the assembly tolerance of the rigid outer conductors 35 (FIGS. 2-3), i.e. the spacer compression is tied with the amount of potential gap between the first portion 43 and the second portion 44 (FIGS. 3-4) of the rigid outer layer. Positively, the threading of the first portion 43 and the second portion 44 (FIGS. 3-4) of the rigid outer layer securely captures the longitudinally compressible spacer 66 therebetween, and via the inner conductor coupler 56, also the inner conductor 48. Also, given that the longitudinally compressible spacer 66 is deformed/crushed during assembly of the rigid RF coaxial transmission line 20 (FIG. 1), the spacer may be disposable. More specifically, in some embodiments, the electrically conductive sleeve 55 may be slightly oversized to cause the needed deformation.

Advantageously, with respect to FIG. 1, the rigid RF coaxial transmission line 20 disclosed herein may withstand structural loads when inserted into the wellbore 21. Indeed, the rigid RF coaxial transmission line 20 may readily withstand the weight and load from long runs of transmission line, such as runs greater than 1500 m. The rigid RF coaxial transmission line 20 is more readily assembled when compared with typical bolt and flange approaches.

Another aspect is directed to a method for making a rigid RF coaxial transmission line 20 (FIG. 1) to be positioned within a wellbore 21 in a subterranean formation 22. The method comprises coupling a series of rigid coaxial sections 30 together in end-to-end relation and to be positioned within the wellbore 21 of the subterranean formation 22, each rigid coaxial section comprising an inner conductor 48 (FIGS. 2, 4-6), a rigid outer conductor 35 (FIGS. 2-3) surrounding the inner conductor, and a dielectric 51 (FIG. 4) therebetween. Each of the rigid outer conductors 35 (FIGS. 2-3) has threaded ends 45, 47. The method also comprises coupling a respective connector 41 (FIG. 4) between adjacent ones of the series of rigid coaxial sections 30, each connector comprising a rigid outer layer 43-44 (FIGS. 3-4) threadingly secured to respective threaded ends 45, 47 of adjacent rigid outer conductors 35, as shown in FIGS. 3-4, and an electrically conductive liner 52-53, as shown in FIGS. 4-6, carried by the rigid outer layer and defining an electrical joint between adjacent rigid outer conductors.

Figure 9:
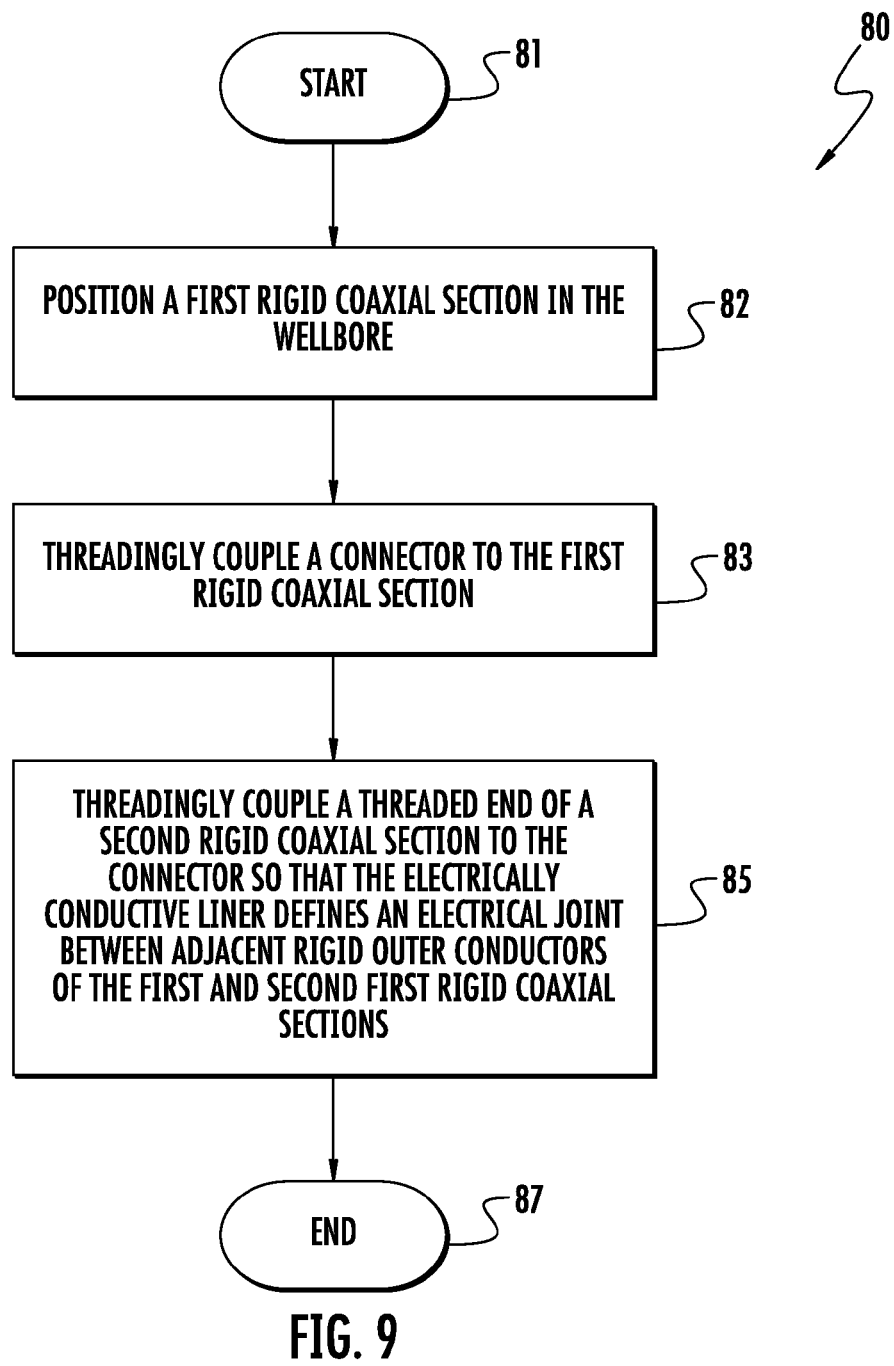
FIG. 9 is a flowchart illustrating a method of assembling the rigid RF coaxial transmission line, according to the present invention.

Referring now additionally to FIG. 9, a flowchart 80 illustrates a method of assembling a rigid RF coaxial transmission line 20 within a wellbore 21 in a subterranean formation 22 (Start Block 81), as shown in FIG. 1. The method comprises positioning a first rigid coaxial section 30 in the wellbore 21 (Block 82), as shown in FIG. 1. The first rigid coaxial section 30 comprises an inner conductor 48, a rigid outer conductor 35 surrounding the inner conductor, and a dielectric 51 therebetween. The rigid outer conductor 35 has a threaded end 45, 47 extending away (out of) from the wellbore 21.

The method also includes coupling a connector 41 (FIG. 4) to the first rigid coaxial section 30 (Block 83), as shown in FIG. 4. Again, as noted above, since the rigid outer conductor 35 may be readily sourced from COTS components, standard tooling may be used to assemble the connector 41 (FIG. 4) onto the first rigid coaxial section 30.

The connector 41 (FIG. 4) comprises a rigid outer layer 43-44 (FIGS. 3-4) threadingly secured to the threaded end 45, 47 of the first rigid coaxial section 30, and an electrically conductive liner 52-53 carried by the rigid outer layer. The method comprises coupling a threaded end 45, 47 of a second rigid coaxial section 30 to the connector 41 (FIG. 4) so that the electrically conductive liner 52-53 defines an electrical joint between adjacent rigid outer conductors 35 of the first and second first rigid coaxial sections 30 (Block 85, End Block 87), as shown in FIG. 4.

Other features relating to RF coaxial transmission lines are disclosed in co-pending application: titled "RIGID RF COAXIAL TRANSMISSION LINE FOR A WELLBORE AND RELATED METHODS," U.S. Pat. No. 8,847,711, Issued Sep. 30, 2014, which is incorporated herein by reference in its entirety.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A rigid radio frequency (RF) coaxial transmission line to be positioned within a wellbore in a subterranean formation, the rigid RF coaxial transmission line comprising:
   a series of rigid coaxial sections coupled together in end-to-end relation and configured to be positioned within the wellbore of the subterranean formation, each rigid coaxial section comprising an inner conductor, a rigid outer conductor surrounding said inner conductor, and a dielectric therebetween;
   each of said rigid outer conductors having threaded ends; and
   a respective connector between adjacent ones of said series of rigid coaxial sections, each connector comprising
      a rigid outer layer threadingly secured to respective threaded ends of adjacent rigid outer conductors and having a recess at a medial portion thereof,
      an electrically conductive liner carried by said rigid outer layer and defining an electrical joint between the adjacent rigid outer conductors, and
      a longitudinally compressible spacer being adjacent to said electrically conductive liner, said longitudinally compressible spacer being received by the recess of said rigid outer layer, and said longitudinally compressible spacer comprising a plurality of passageways configured to permit flow of fluid therethrough.

2. The rigid RF coaxial transmission line according to claim 1 wherein, in each connector, said electrical joint comprises an electrically conductive compression joint.

3. The rigid RF coaxial transmission line according to claim 2 wherein, in each connector, said longitudinally compressible spacer has a bore therethrough; and wherein each connector comprises an inner conductor coupler carried by the bore of said longitudinally compressible spacer and electrically coupling ends of adjacent ones of said inner conductor in the series of rigid coaxial sections.

4. The rigid RF coaxial transmission line according to claim 3 wherein, in each connector, said longitudinally compressible spacer comprises a dielectric body and an electrically conductive sleeve surrounding said dielectric body.

5. The rigid RF coaxial transmission line according to claim 1 wherein, in each connector, said electrically conductive liner comprises at least one of copper, aluminum, gold, and beryllium.

6. The rigid RF coaxial transmission line according to claim 1 wherein, in each connector, said rigid outer layer and said electrically conductive liner are bonded together.

7. The rigid RF coaxial transmission line according to claim 1 wherein, in each connector, said electrically conductive liner has a greater electrical conductivity than said rigid outer layer.

8. The rigid RF coaxial transmission line according to claim 1 wherein, in each connector, said electrically conductive liner has a same electrical conductivity as said rigid outer conductor.

9. The rigid RF coaxial transmission line according to claim 1 wherein, in each connector, said rigid outer layer comprises steel.

10. A rigid radio frequency (RF) coaxial transmission line to be positioned within a wellbore in a subterranean formation, the rigid RF coaxial transmission line comprising:
    a series of rigid coaxial sections coupled together in end-to-end relation and configured to be positioned within the wellbore of the subterranean formation, each rigid coaxial section comprising an inner conductor, a rigid outer conductor surrounding said inner conductor, and a dielectric therebetween;
    each of said rigid outer conductors having threaded ends; and
    a respective connector between adjacent ones of said series of rigid coaxial sections, each connector comprising
       a rigid outer layer threadingly secured to respective threaded ends of adjacent rigid outer conductors,
       an electrically conductive liner carried by said rigid outer layer and defining an electrical joint between the adjacent rigid outer conductors, said electrically conductive liner having a greater electrical conductivity than said rigid outer layer, and
       a longitudinally compressible spacer being adjacent to said electrically conductive liner, and said longitudinally compressible spacer comprising a plurality of passageways configured to permit flow of fluid therethrough.

11. A rigid radio frequency (RF) coaxial transmission line to be positioned within a wellbore in a subterranean formation, the rigid RF coaxial transmission line comprising:
    a series of rigid coaxial sections coupled together in end-to-end relation and configured to be positioned within the wellbore of the subterranean formation, each rigid coaxial section comprising an inner conductor, a rigid outer conductor surrounding said inner conductor, and a dielectric therebetween;
    each of said rigid outer conductors having threaded ends; and
    a respective connector between adjacent ones of said series of rigid coaxial sections, each connector comprising
       a rigid outer layer threadingly secured to respective threaded ends of adjacent rigid outer conductors and having a recess at a medial portion thereof,
       an electrically conductive liner carried by and bonded to said rigid outer layer and defining an electrically conductive compression joint between the adjacent rigid outer conductors, and
       a longitudinally compressible spacer being adjacent to said electrically conductive liner, said longitudinally compressible spacer being received by the recess of said rigid outer layer, and said longitudinally compressible spacer comprising a plurality of passageways configured to permit flow of fluid therethrough.

12. The rigid RF coaxial transmission line according to claim 11 wherein, in each connector, said longitudinally compressible spacer has a bore therethrough; and wherein each connector comprises an inner conductor coupler carried by the bore of said longitudinally compressible spacer and electrically coupling ends of adjacent ones of said inner conductor in the series of rigid coaxial sections.

13. The rigid RF coaxial transmission line according to claim 12 wherein, in each connector, said longitudinally compressible spacer comprises a dielectric body and an electrically conductive sleeve surrounding said dielectric body.

14. The rigid RF coaxial transmission line according to claim 11 wherein, in each connector, said rigid outer layer comprises steel.

15. The rigid RF coaxial transmission line according to claim 11 wherein, in each connector, said electrically conductive liner has a greater electrical conductivity than said rigid outer layer.

16. The rigid RF coaxial transmission line according to claim 11 wherein, in each connector, said electrically conductive liner has a same electrical conductivity as said rigid outer conductor.

17. A rigid radio frequency (RF) coaxial transmission line to be positioned within a wellbore in a subterranean formation, the rigid RF coaxial transmission line comprising:
a series of rigid coaxial sections coupled together in end-to-end relation and configured to be positioned within the wellbore of the subterranean formation, each rigid coaxial section comprising an inner conductor, a rigid outer conductor surrounding said inner conductor, and a dielectric therebetween;
each of said rigid outer conductors having threaded ends; and
a respective connector between adjacent ones of said series of rigid coaxial sections, each connector comprising
a rigid outer layer threadingly secured to respective threaded ends of adjacent rigid outer conductors,
an electrically conductive liner carried by said rigid outer layer and defining an electrical joint between the adjacent rigid outer conductors, said electrically conductive liner having a same electrical conductivity as said rigid outer conductor, and
a longitudinally compressible spacer being adjacent to said electrically conductive liner, and said longitudinally compressible spacer comprising a plurality of passageways configured to permit flow of fluid therethrough.

18. A method for making a rigid radio frequency (RF) coaxial transmission line to be positioned within a wellbore in a subterranean formation, the method comprising:
coupling a series of rigid coaxial sections together in end-to-end relation and to be positioned within the wellbore of the subterranean formation, each rigid coaxial section comprising an inner conductor, a rigid outer conductor surrounding the inner conductor, and a dielectric therebetween, each of the rigid outer conductors having threaded ends; and
coupling a respective connector between adjacent ones of the series of rigid coaxial sections, each connector comprising
a rigid outer layer threadingly secured to respective threaded ends of adjacent rigid outer conductors and having a recess at a medial portion thereof,
an electrically conductive liner carried by the rigid outer layer and defining an electrical joint between the adjacent rigid outer conductors, and
a longitudinally compressible spacer being adjacent to the electrically conductive liner, the longitudinally compressible spacer being received by the recess of the rigid outer layer, and the longitudinally compressible spacer comprising a plurality of passageways configured to permit flow of fluid therethrough.

19. The method according to claim 18 wherein the coupling of the respective connector defines the electrical joint to comprise an electrically conductive compression joint.

20. The method according to claim 19 wherein, in each connector, the longitudinally compressible spacer has a bore therethrough; and further comprising forming each connector to comprise an inner conductor coupler carried by the bore of the longitudinally compressible spacer and electrically coupling ends of adjacent ones of the inner conductor in the series of rigid coaxial sections.

21. The method according to claim 20 wherein the forming of each connector comprises forming the longitudinally compressible spacer to comprise a dielectric body and an electrically conductive sleeve surrounding the dielectric body.

22. The method according to claim 18 further comprising, in each connector, bonding the rigid outer layer and the electrically conductive liner together.

23. A method of assembling a rigid radio frequency (RF) coaxial transmission line within a wellbore in a subterranean formation, the method comprising:
positioning a first rigid coaxial section in the wellbore, the first rigid coaxial section comprising an inner conductor, a rigid outer conductor surrounding the inner conductor, and a dielectric therebetween, the rigid outer conductor having a threaded end extending away from the wellbore;
coupling a connector to the first rigid coaxial section, the connector comprising
a rigid outer layer threadingly secured to the threaded end of the first rigid coaxial section and having a recess at a medial portion thereof,
an electrically conductive liner carried by the rigid outer layer, and
a longitudinally compressible spacer being adjacent to the electrically conductive liner, the longitudinally compressible spacer being received by the recess of the rigid outer layer, and the longitudinally compressible spacer comprising a plurality of passageways configured to permit flow of fluid therethrough; and
coupling a threaded end of a second rigid coaxial section to the connector so that the electrically conductive liner defines an electrical joint between adjacent rigid outer conductors of the first and second first rigid coaxial sections.

24. The method according to claim 23 wherein the coupling of the threaded end of the second rigid coaxial section to the connector defines the electrical joint to comprise an electrically conductive compression joint.

25. The method according to claim 24 wherein, in each connector, the longitudinally compressible spacer has a bore therethrough; and further comprising forming each connector to comprise an inner conductor coupler carried by the bore of the longitudinally compressible spacer and electrically coupling ends of adjacent ones of the inner conductor in the first and second rigid coaxial sections.

26. The method according to claim 25 wherein the forming of each connector comprises forming the longitudinally compressible spacer to comprise a dielectric body and an electrically conductive sleeve surrounding the dielectric body.

27. The method according to claim 23 further comprising, in each connector, bonding the rigid outer layer and the electrically conductive liner together.

* * * * *